United States Patent
Copeland et al.

(10) Patent No.: US 7,682,730 B2
(45) Date of Patent: *Mar. 23, 2010

(54) BATTERY CATHODE

(75) Inventors: Terry Copeland, Holliston, MA (US);
Stuart M. Davis, Norfolk, MA (US);
Tae-Won Lee, Pearl River, NY (US);
Alexander A. Leef, Waltham, MA (US);
Gary A. Miller, Milton, MA (US);
Shuming Zeng, Brookfield, CT (US)

(73) Assignee: The Gillette Company, Boston, MA (US)

( * ) Notice: Subject to any disclaimer, the term of this patent is extended or adjusted under 35 U.S.C. 154(b) by 1044 days.

This patent is subject to a terminal disclaimer.

(21) Appl. No.: 11/374,674

(22) Filed: Mar. 14, 2006

(65) Prior Publication Data
US 2006/0159992 A1    Jul. 20, 2006

Related U.S. Application Data

(63) Continuation of application No. 09/645,632, filed on Aug. 24, 2000, now Pat. No. 7,045,247.

(51) Int. Cl.
*H01M 4/00* (2006.01)
*H01M 2/02* (2006.01)
*H01M 6/08* (2006.01)
(52) U.S. Cl. .................. 429/128; 429/165; 429/164
(58) Field of Classification Search .................. 429/128, 429/164, 165
See application file for complete search history.

(56) References Cited

U.S. PATENT DOCUMENTS

| 320,232 | A | 6/1885 | DuShane |
| 720,321 | A | 2/1903 | Buchanan |
| 2,424,149 | A | 7/1947 | Chaplin |
| 3,205,097 | A | 9/1965 | Clune et al. |
| 3,759,746 | A | 9/1973 | McCallum |
| 3,759,747 | A | 9/1973 | Schaer |
| 4,553,419 | A | 11/1985 | Goodman |
| 5,487,961 | A | 1/1996 | Strangways et al. |
| 5,536,596 | A | 7/1996 | Lake |
| 5,556,722 | A | 9/1996 | Narukawa et al. |
| 5,677,080 | A | 10/1997 | Chen |
| 5,882,815 | A | 3/1999 | Tagawa |
| 6,007,936 | A | 12/1999 | Iwase et al. |
| 6,013,379 | A | 1/2000 | Uesugi et al. |
| 6,074,781 | A * | 6/2000 | Jurca ........................ 429/209 |

(Continued)

FOREIGN PATENT DOCUMENTS

EP    0 654 837 A1    5/1995

(Continued)

OTHER PUBLICATIONS http:/mathforum.org/dr.math/.

(Continued)

*Primary Examiner*—Patrick Ryan
*Assistant Examiner*—Helen O Chu
(74) *Attorney, Agent, or Firm*—Fish & Richardson P.C.

(57) ABSTRACT

A cathode having a groove extending about 10 to about 450 microns into a surface of the cathode. The cathode can also be roughened.

12 Claims, 14 Drawing Sheets

U.S. PATENT DOCUMENTS

| | | |
|---|---|---|
| 6,242,121 B1 | 6/2001 | Pedicini et al. |
| 6,274,261 B1 | 8/2001 | Tinker et al. |

FOREIGN PATENT DOCUMENTS

| | | |
|---|---|---|
| EP | 0848441 A1 | 6/1998 |
| GB | 1 404 654 | 3/1975 |
| GB | 2 231 196 | 4/1989 |
| JP | 61-214362 | 9/1986 |
| JP | 63-150855 | 6/1988 |
| JP | 02-012762 | 1/1990 |
| JP | 05 041211 | 2/1993 |
| JP | 06 333550 | 12/1994 |
| JP | 115982 | 4/1997 |
| JP | 11-217266 | 10/1999 |
| WO | WO 00/01022 | 1/2000 |

OTHER PUBLICATIONS http://www.geom.uiuc.edu/docs/reference/CRC-formulas/node57.html.

Linden, "Handbook of Batteries", $2^{nd}$ Edition, McGraw-Hill, pp. 28.2-28.3, 1995.

* cited by examiner

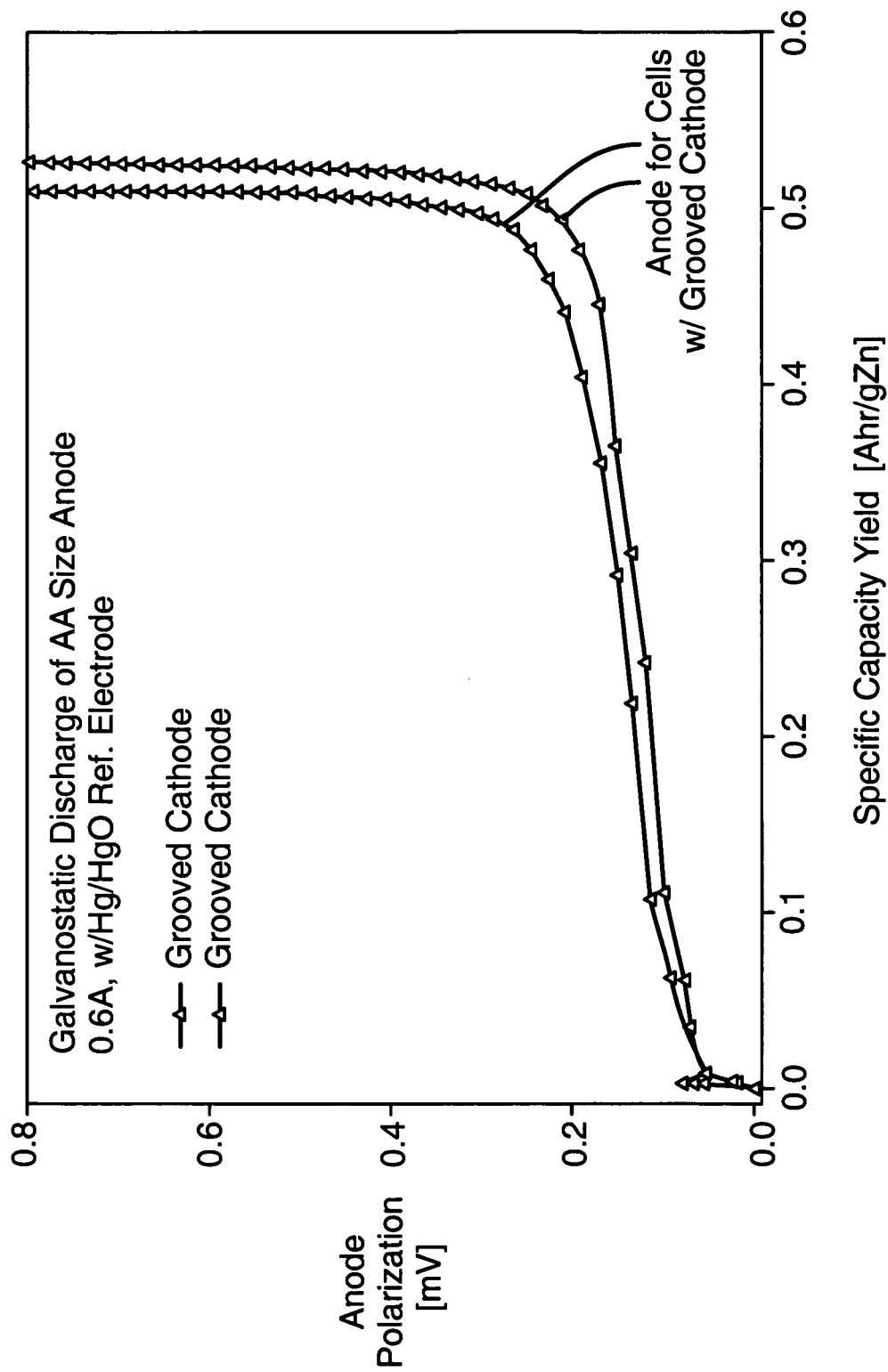

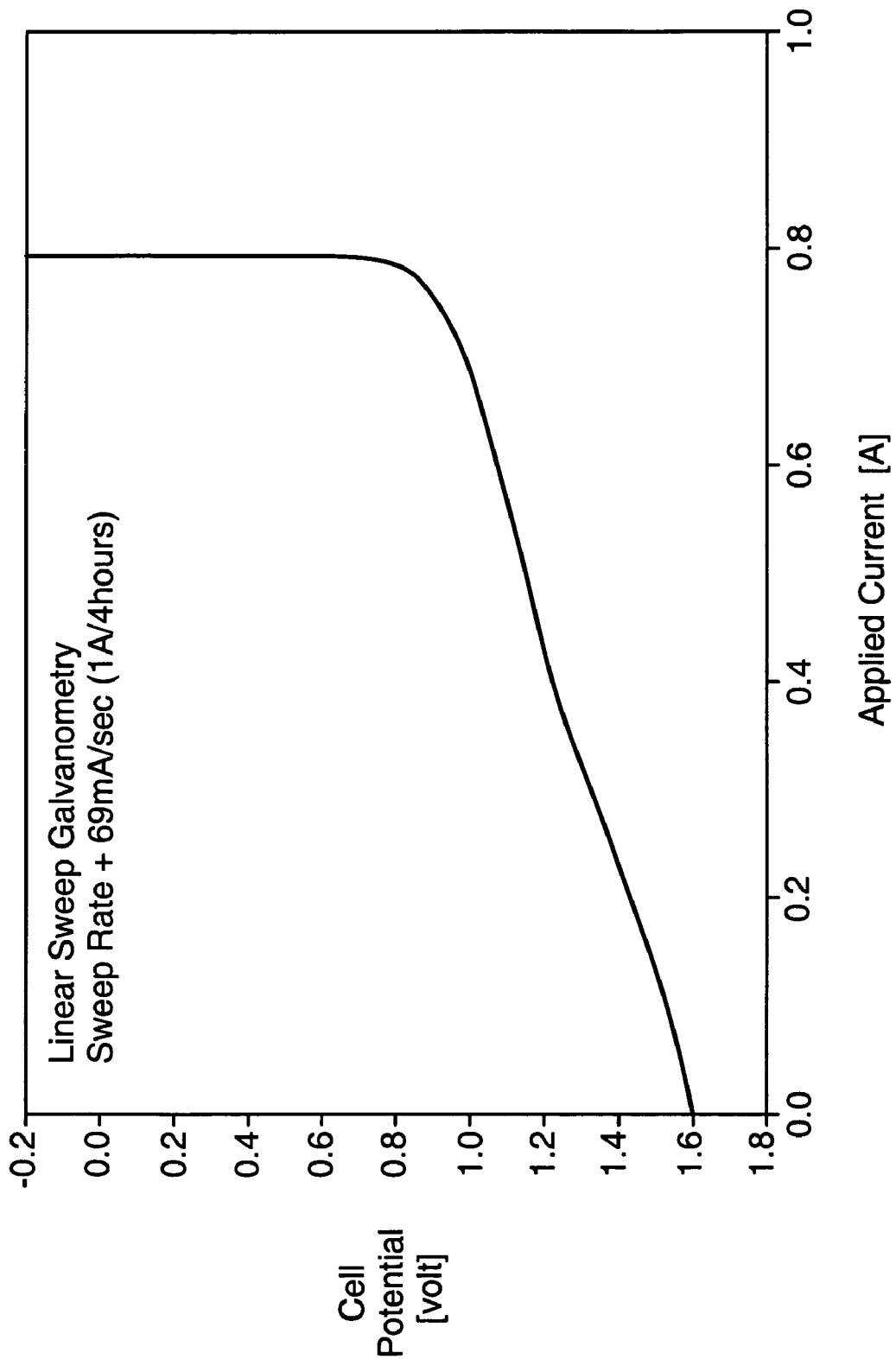

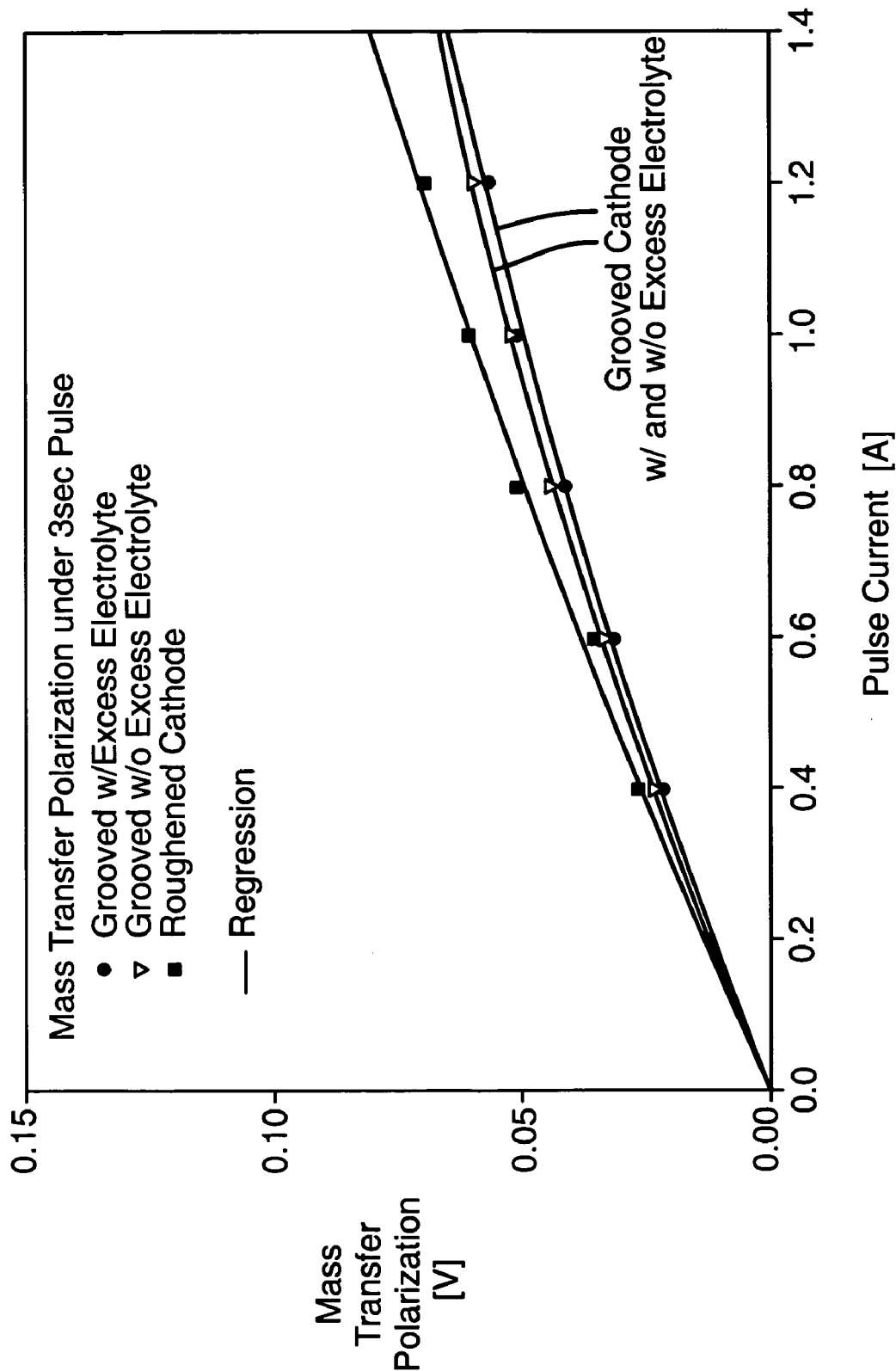

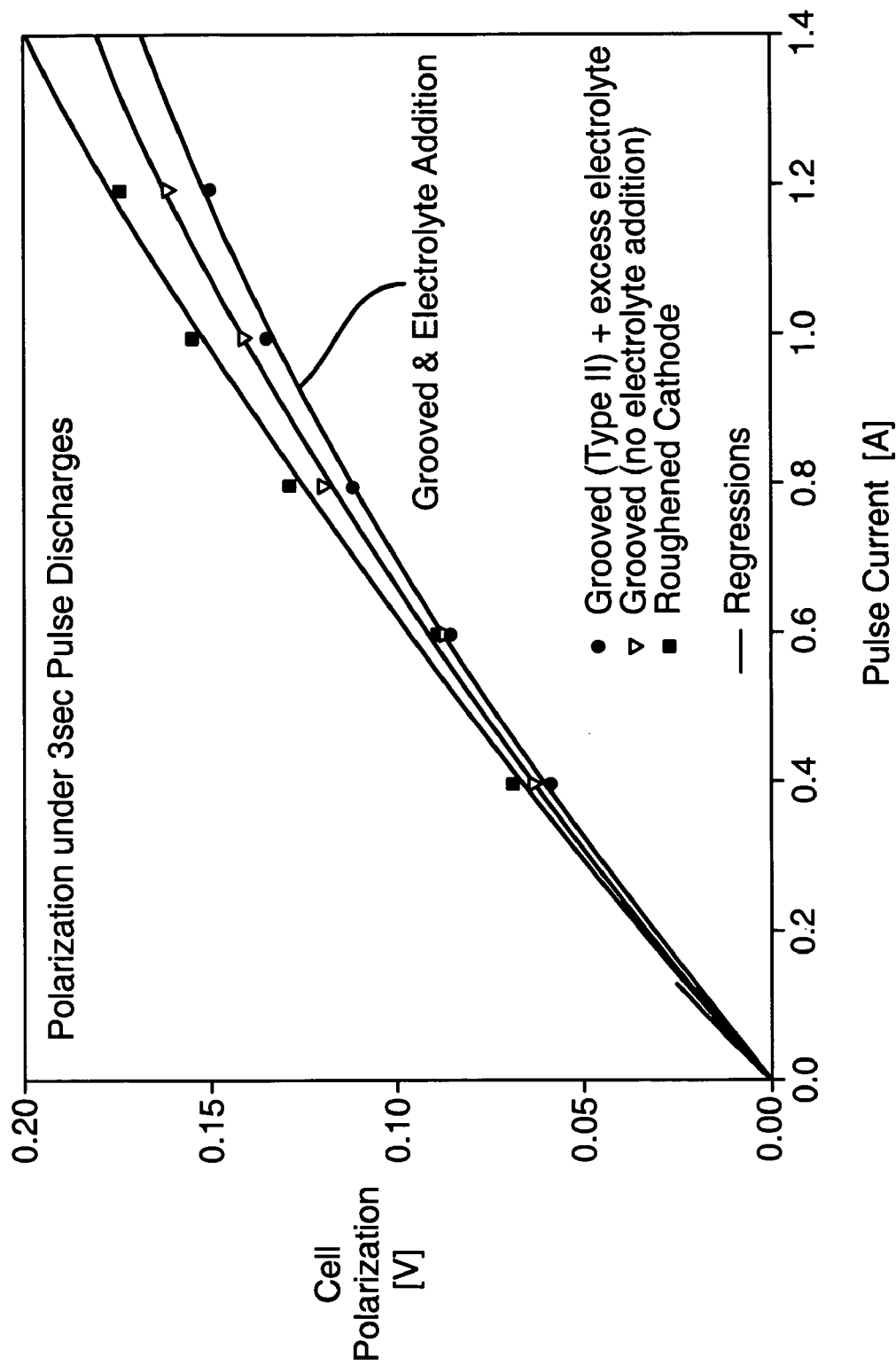

BATTERY CATHODE

This application is a continuation (and claims the benefit of priority under 35 U.S.C. §120) of U.S. Ser. No. 09/645,632, filed on Aug. 24, 2000, now U.S. Pat. No. 7,045,247.

BACKGROUND

This invention generally relates to battery cathodes.

Batteries are commonly used electrical energy sources. A battery contains a negative electrode, typically called an anode, and a positive electrode, typically called a cathode. The cathode may include a positive active material (e.g., a transition metal oxide such as $MnO_2$) that can be reduced, a conductive aid (e.g., graphite), and a binder (e.g., polyethylene (PE)). The anode can be a gel including an active material (e.g., zinc particles) that can be oxidized. The anode active material is capable of reducing the cathode active material. In order to prevent direct reaction of the anode material and the cathode material, the anode and the cathode are electrically isolated from each other by a separator.

When the battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

Alkaline batteries include cylindrical batteries, for example, the conventional AA, AAA, AAAA, C, and D batteries, commonly sold in stores. These conventional alkaline batteries include a cylindrical container (called a can) containing a central, cylindrical gel anode surrounded by a hollow cylindrical transition metal oxide cathode.

A cylindrical cathode can be made by a number of ways. One method is to place a number of ring-shaped discs in the can to form a tall, loose fitting hollow cylinder. The discs are reformed in the can to provide good contact to the can wall by placing a core rod in the cavity of the cylinder and re-compacting the discs by applying pressure to the top of the discs. The discs can also be made oversized, i.e., the outer diameter of the discs is bigger than the inner diameter of the can, and force fit into the can by inserting them through a tapered funnel. Another method of making the cathode includes placing cathode powder or granules in the can and forming the cathode by driving a central core rod into the powder while restraining the powder on the top surface of the cathode with a punch. Cathodes made by these methods can have shiny, glazed surfaces with closed pores.

SUMMARY

The invention relates to a battery having a cathode modified by grooving and/or roughening. Generally, the modified battery has good capacity at high and low drain rates and under continuous and intermittent discharge rates.

Without wishing to be bound to any theories, it is believed that modifying the cathode enhances the performance of the battery by increasing the surface area of the cathode and allowing more electrolyte to be sorbed through open pores on the surface of the cathode. Increased surface area and/or electrolyte flux may enhance battery performance by lowering mass transfer resistance in the cathode, lowering separator polarization, and/or delaying anode passivation.

In one aspect, the invention features a cathode having at least one groove extending about 10 to about 450 microns, preferably about 70 to about 110 microns, into a surface of the cathode. The cathode can be shaped as a cored cylinder having an interior surface and an exterior surface, wherein the groove extends into the interior surface of the cathode. The groove may extend helically about the longitudinal axis of the cathode or parallel to the length of the cathode. The cathode can be shaped as a prism, and the groove may extend into a major surface of the cathode. The invention also features a battery (e.g., cylindrical, prismatic, and button) having the cathode as generally described above.

In another aspect, the invention features a cathode having a surface and including graphite particles at a surface of the cathode. The graphite particles may have a-b crystallographic planes oriented substantially non-parallel, e.g., substantially perpendicular, to the surface of the cathode. The a-b crystallographic planes of the graphite particles may be oriented substantially perpendicular to the length of the cathode and/or substantially parallel to the major axis of the cathode. The cathode may include a current collector having a major surface perpendicular to the a-b planes of the graphite particles. The cathode may be shaped as a cylinder or a prism. The invention also features a battery (e.g., cylindrical, prismatic, and button) having the cathode as generally described above.

In another aspect, the invention features a battery having a cathode having at least one groove extending about 10 to about 450 microns, e.g., about 70 to about 100 microns, into a surface of the cathode, as generally described above. The cathode may define a cavity and the battery may include a separator having a cylindrical shape disposed in the cavity. The battery can be cylindrical (e.g., a AA, AAA, C, D) and can have a separator shaped as a cylinder.

In another aspect, the invention features a method of making a cathode and a battery. The method includes forming grooves in the surface of the cathode. The grooves may extend into the surface to a depth of about 10 to about 450 microns. Forming the grooves may include contacting a threaded tap with the surface of the cathode, contacting a straight fluted tap to the surface of the cathode, and/or mechanically removing a portion of the surface of the cathode, e.g., by turning or pushing.

In another aspect, the invention features a method of making a battery including forming a cathode having a surface and graphite particles at the surface of the cathode, wherein the graphite particles have a-b crystallographic planes oriented non-parallel to the surface of the cathode. The method may further include placing a separator adjacent to the surface of the cathode.

In another aspect, the invention features a method of making a battery including forming a cathode including graphite particles having a-b crystallographic planes oriented substantially parallel to a surface of the cathode. Forming the cathode may include packing a portion of cathode material in a can. The method may further include drilling the cathode perpendicularly to the surface of the cathode.

The method can substantially orient the graphite particles such that the a-b planes are parallel to the plane of conduction at the inner diameter, at the outer diameter, and within the bulk of the cathode for cylindrical cells. This orientation facilitates both electronic and ionic conduction in the cathode.

Other features, objects, and advantages of the invention will be apparent from the description and drawings, and from the claims.

DESCRIPTION OF DRAWINGS

FIGS. 7A-B are graphs showing anode passivation vs. capacity for cells with grooved cathodes, under galvanostatic and galvanodynamic discharge, respectively;

FIGS. 8A-B are graphs showing polarization (Ohmic and kinetic, and mass transfer, respectively) vs. pulse current for cells with grooved cathodes;

FIG. 9 is a graph showing cell polarization vs. pulse current for cells with grooved cathodes;

DETAILED DESCRIPTION

The invention relates to a battery cathode having a surface that enhances the performance of the battery.

Figure 1:
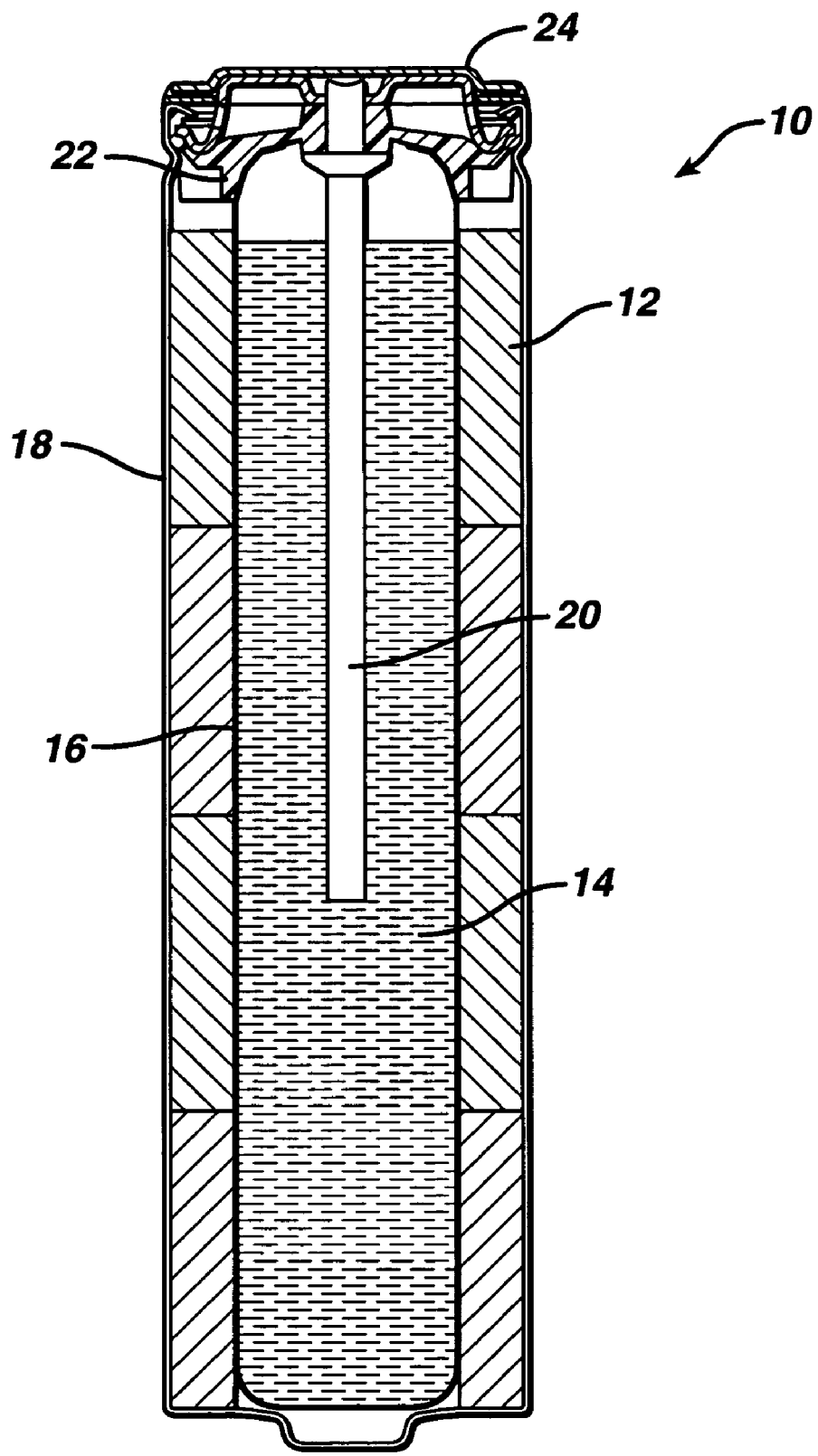
FIG. 1 is a side-sectional view of a cylindrical battery.

Referring to FIG. 1, battery 10 includes a cathode 12, an anode 14, a separator 16 and a cylindrical can 18. Battery 10 also includes a current collector 20, a seal 22, and a metal top cap 24, which serves as the negative terminal for the battery. The cathode 12 is in contact with the can 18, and the positive terminal of the battery is at the opposite end of the battery from the negative terminal. An electrolytic solution is dispersed throughout battery 10. The invention described herein can be applied to batteries of different sizes, but for purposes of the embodiment described below, battery 10 is a AA battery.

Cathode 12 includes an active material, such as manganese dioxide, graphite particles, an alkaline electrolyte, and a binder.

Any of the conventional forms of manganese dioxide used for cathodes can be used. The preferred manganese dioxide is electrolytically-synthesized $MnO_2$ (EMD), although chemically-synthesized $MnO_2$ (CMD), and mixtures of EMD and CMD can also be used. Distributors of such manganese dioxides include Kerr McGee, Co. (Trona D), Chemetals, Co., Tosoh, Delta Manganese, Mitsui Chemicals, JMC, Evachem, and Chuo Denki. Generally, the cathode includes between about 80% and about 88% by weight of manganese dioxide.

The graphite particles act as a conductive aid to increase the electronic conductivity of the cathode. The graphite particles can be any of the conventional graphite particles used in cathodes. They can be synthetic or nonsynthetic, and they can be expanded or nonexpanded. In certain embodiments, the graphite particles are nonsynthetic, nonexpanded graphite particles. In these embodiments, the graphite particles preferably have an average particle size of less than about 20 microns, more preferably from about 2 microns to about 12 microns, and most preferably from about 5 microns to about 9 microns as measured using a Sympatec HELIOS analyzer. Nonsynthetic, nonexpanded graphite particles can be obtained from, for example, Brazilian Nacional de Grafite (Itapecirica, MG Brazil (MP-0702X). Generally, the cathode includes between about 4% and about 10% by weight of graphite particles.

Examples of binders include polyethylene powders, polyacrylamides, Portland cement and fluorocarbon resins, such as polyvinylidine fluoride (PVDF) and polytetrafluoroethylene (PTFE). An example of a polyethylene binder is sold under the tradename Coathylene HA-1681 (Hoechst). Generally, the cathode includes between about 0.1 percent to about 1 percent by Weight of binder.

Cathode 12 may include other additives. Examples of these additives are disclosed in U.S. Pat. No. 5,342,712, which is hereby incorporated by reference. Cathode 12 may include, for example, from about 0.2 weight percent to about 2 percent by weight, of $TiO_2$.

The electrolyte solution, e.g., 9N KOH, may be dispersed through cathode 12, and the weight percentages provided above are determined after the electrolyte solution has been dispersed. Generally, the cathode includes between about 4 percent to about 8 percent by weight of electrolyte. In some embodiments, no electrolyte solution is added to the cathode, but the cathode absorbs electrolyte from other cell components, e.g., the separator and/or the anode, after the cell is assembled.

Figure 2A:
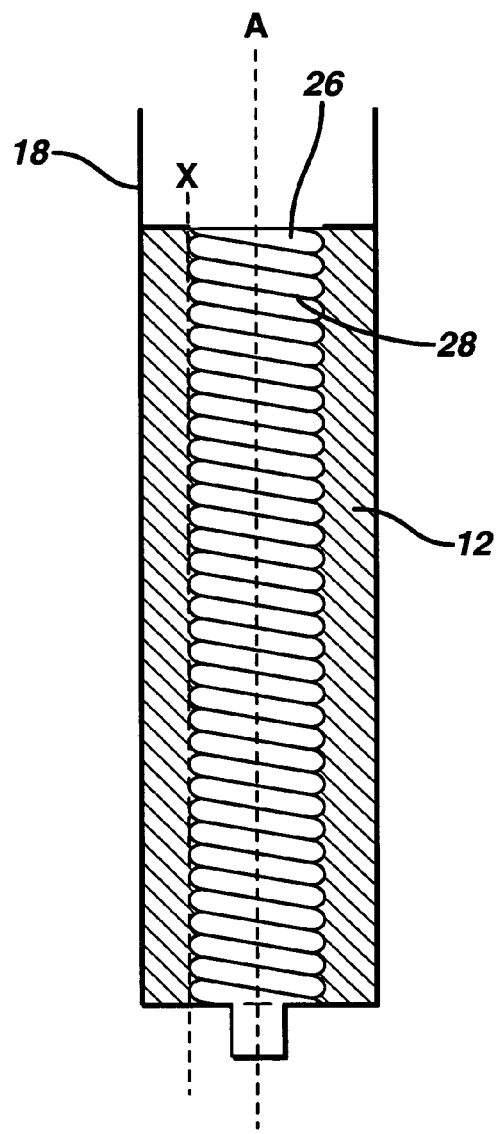
FIGS. 2A-2B are schematic side-sectional views of cylindrical batteries having grooved cathodes.
Figure 2B:
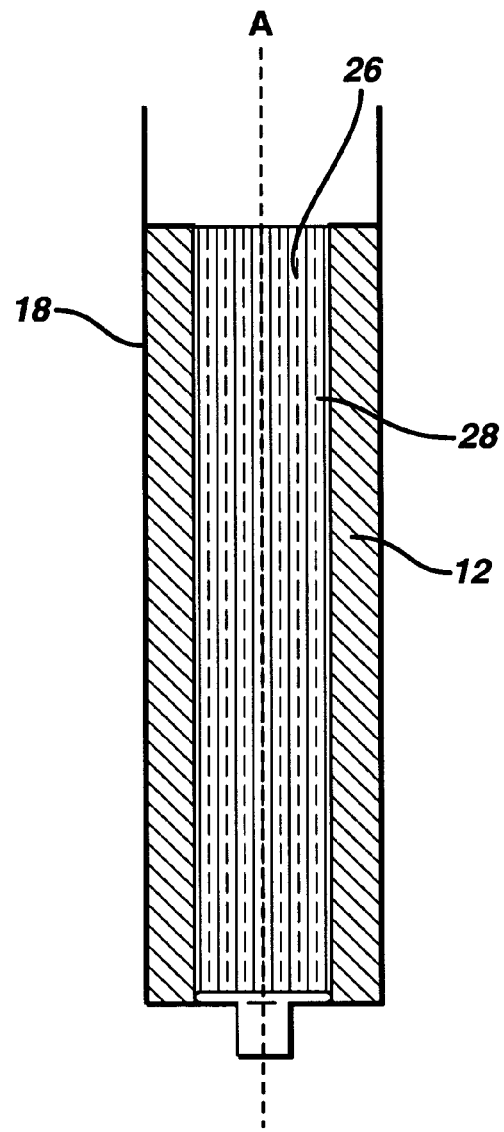

Referring to FIGS. 2A-B, interior surface 26 of cathode 12 includes grooves. As used herein, a "groove" is an elongated channel or depression on a surface. The cathode 12 can be grooved by removing a portion of a surface of the cathode 12, for example, by turning a threaded tap through the cavity of the cathode 12 to produce a helical groove 28 extending about longitudinal axis A of can 18 and cathode 12, as shown in FIG. 2A. Larger threads can be used to remove more cathode material and to form larger grooves. The cathode 12 can also be grooved by pushing an appropriately-sized, fluted die through the cathode 12 to form grooves 28 extending parallel to the longitudinal axis A, as shown in FIG. 2B. Vertical grooves can also be formed by sawing (e.g., with a hacksaw) the interior surface 26 of the cathode 12. The grooves can also be formed by scratching the surface of the cathode, for example, with a dental pick or a wire brush. Grooves of other configurations can also be used. For example, grooves can be wavy, serpentine, zigzagged, or discontinuous. Depending on the size of the grooves, different number of grooves may be formed, e.g., about 24 to about 72 grooves may be formed.

Alternatively, or in addition, the surface of the cathode 12 can be made rough, for example, by sanding the cathode with 200-400 grit sandpaper. As used herein, "rough" generally means textured, coarse, uneven, irregular, non-uniform, or not smooth. For example, a rough surface generally has unequal ridges and projections. In one method, the surface of the cathode 12 can be roughened by using a cathode pellet-forming plunger having a roughened surface that can roughen the inner surface of the cathode 12. For example, after the plunger is plunged into a cathode disc or cylinder to form a ring-shaped disc or hollowed cylinder, the plunger can be twisted radially against the interior surface of the formed disc or cylinder to roughen the disc or cylinder. Once the radial twist/roughen operation is completed, the plunger is withdrawn from the formed disc or cylinder. Other methods of roughening include, for example, sand etching, using a pressure nozzle, using a wire brush, and rubbing the cathode with a hard surface.

For AA cells, interior surface 26 of cathode 12 is grooved and/or roughened such that no more than 6% of the original thickness of the cathode is removed, although the amount of cathode removed generally depends on the starting inner diameter of the cathode. Preferably, no more than 4.5% is removed, and more preferably, no more than 2% is removed. Referring to FIG. 2A, the distance between a longitudinal line, e.g., line X, extending along interior surface 26 of cathode 12 and the interior surface of can 18 preferably remains substantially the same along the length of cathode 12. As used herein, "substantially the same" means that the distance does not differ by more than 3%. Expressed another way, grooves 28 can extend beneath the original, unmodified interior surface 26 of the cathode 12 about 10 to about 450 microns, preferably, about 70 to about 110 microns, and more preferably, about 90 to about 110 microns. As a result, when a grooved cathode is used in a cylindrical alkaline battery, a generally straight-walled cylindrical separator may be used for the battery even though the interior surface 26 of the cathode has been grooved and/or roughened. Generally, to maintain the maximum amount of active material in the battery, a cathode that is to be modified by grooving or roughening is provided slightly thicker than an unmodified cathode in order to compensate for the loss of cathode material as a result of grooving or roughening. Methods of forming alkaline cathodes and batteries are known and are described in, e.g., U.S. Ser. No. 09/559,872, filed Apr. 26, 2000, hereby incorporated by reference in its entirety.

Grooving and/or roughening the cathode 12 increases the surface area of interior surface 26. Depending on the size of the grooves, e.g., by adjusting the size of the threads on the die, the apparent surface area of the interior surface 26 can be increased by more than 100%.

Referring to Table 1, exemplary experimental parameters used to prepare grooved and roughened cathodes for a standard AA cathode are shown. As used herein, "preshot" is the amount of electrolyte added to the battery before the separator is placed, not including the electrolyte already included in the cathode pellets.

TABLE 1

| Test Cells | Groove/Roughen Method | Active Material Loss | Preshot Added | Internal Resistance (mΩ) |
|---|---|---|---|---|
| Groove Type I | 3/8" 36 Fine | −3.6% | +9%, 0% | 55, 55 |
| Groove Type II | 3/8" 24 Medium | −2.6% | +6%, 0% | 54, 55 |
| Groove Type III | 3/8" 16 Coarse | −2.2% | +5%, 0% | 57, 58 |
| Roughened | #400 Sand Paper | 0 | 0 | 56 |

Figure 3:
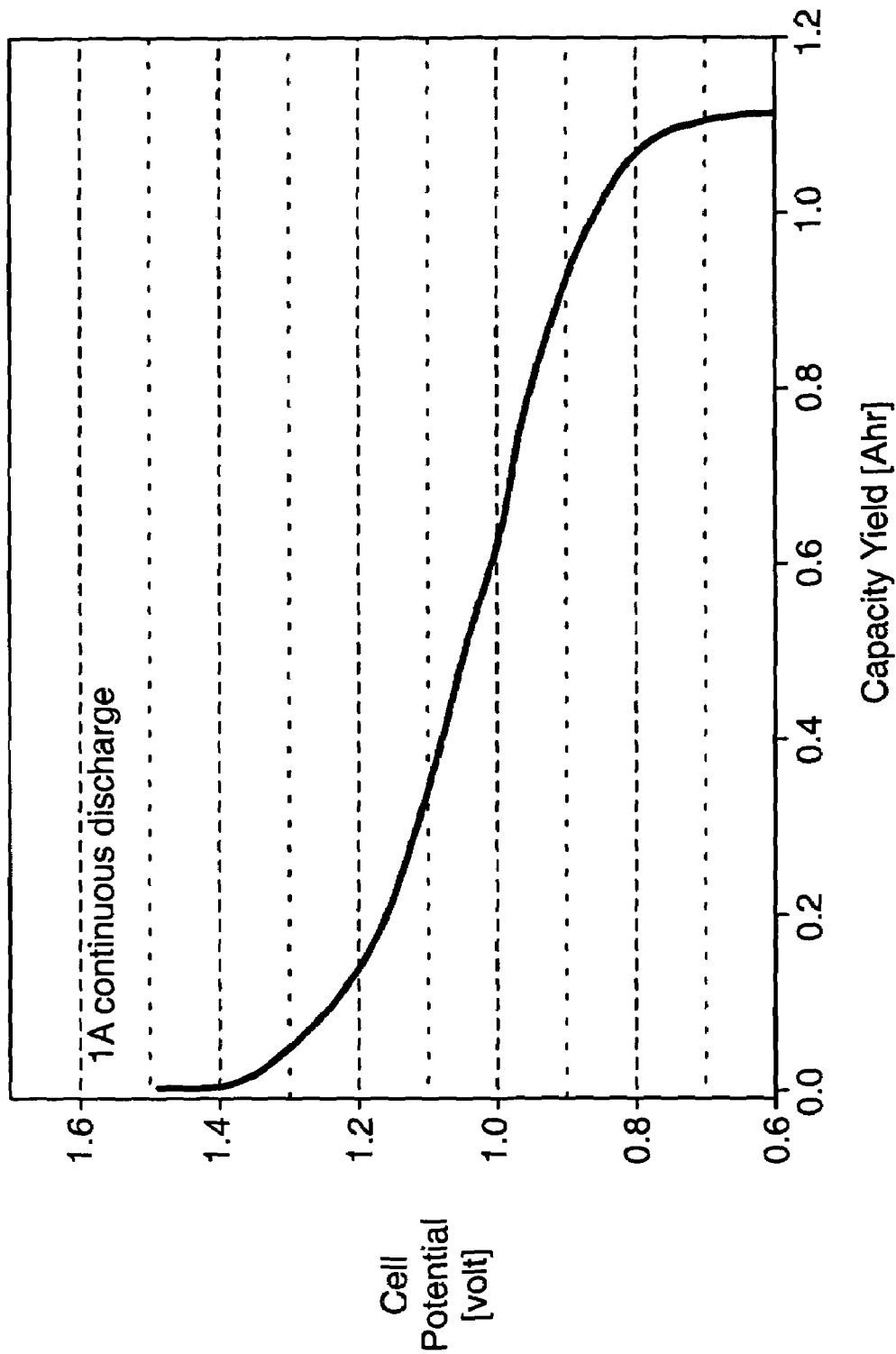
FIG. 3 is a graph showing cell potential vs. capacity yield for a battery having a grooved cathode.
Figure 4:
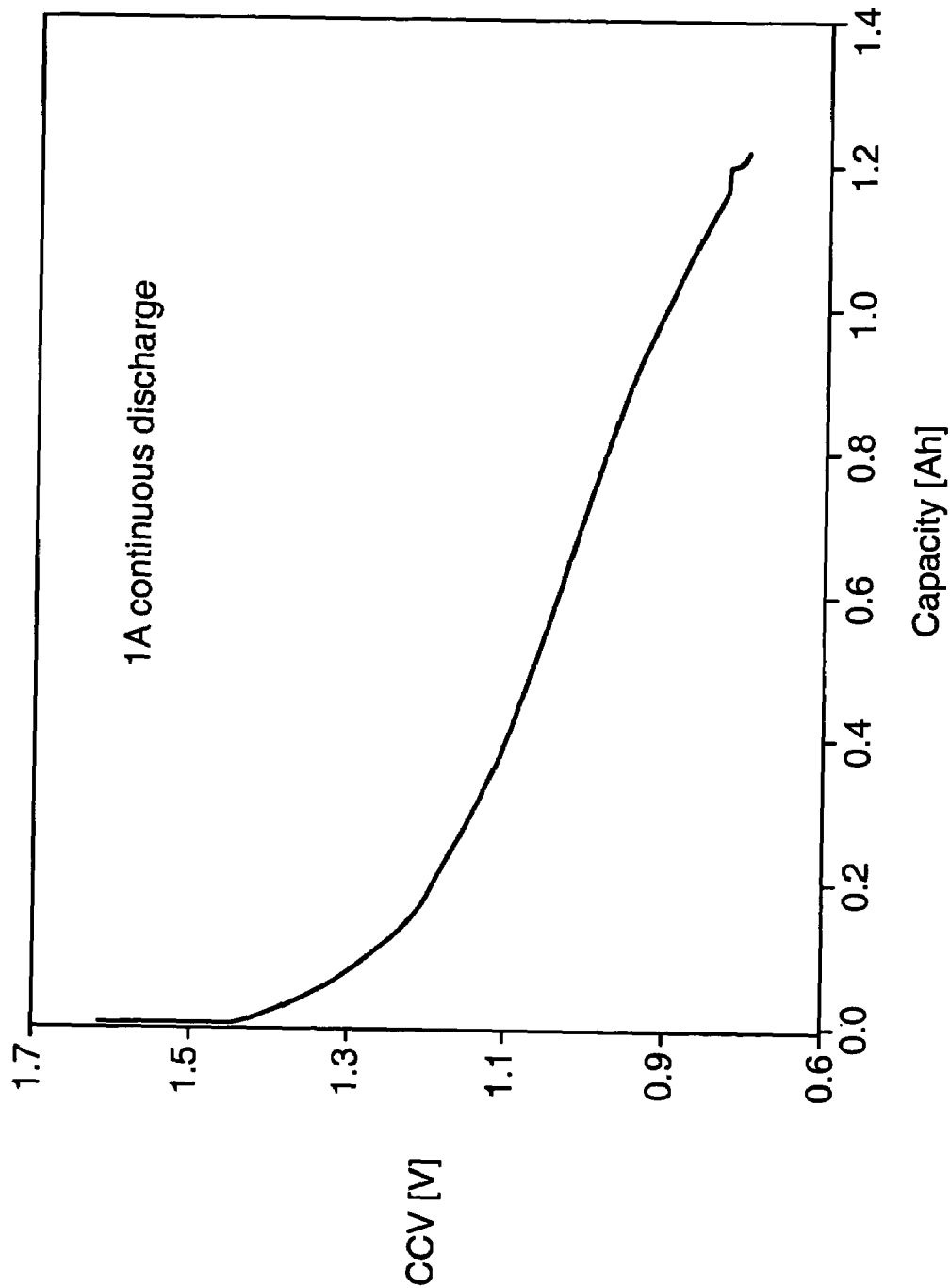
FIG. 4 is a graph showing cell potential vs. capacity yield for another battery having a grooved cathode.

The resulting grooved-cathode batteries, with or without including additional electrolyte, exhibit good performance. Referring to FIGS. 3 and 4, two different types of cells with grooved cathodes exhibit good capacity under 1 Amp of continuous discharge.

Referring to Table 2, batteries having grooved cathodes generally exhibit good capacity at high and low drain rates and under continuous and intermittent discharge rates. Generally, the capacity yield improvements with grooved cathodes are higher at higher cutoff voltages. The cutoff voltage is the voltage at which a test is terminated because, e.g., the device cannot function at a lower voltage than this cutoff.

TABLE 2

| Test Regimes | Discharge Conditions | Capacity Yield (Ahr) | | | |
|---|---|---|---|---|---|
| | | 1.1 V | 1.0 V | 0.9 V | 0.8 V |
| 1 Amp | Continuous | 0.30 | 0.55 | 0.81 | 0.94 |
| 1 Watt | Continuous | 0.36 | 0.58 | 0.79 | 0.89 |
| 1 Ohm | Continuous | 0.26 | 0.60 | 0.89 | 1.01 |

TABLE 2-continued

| Test Regimes | Discharge Conditions | Capacity Yield (Ahr) | | | |
|---|---|---|---|---|---|
| | | 1.1 V | 1.0 V | 0.9 V | 0.8 V |
| 1.1 A (CC-Photo; Flash Camera) | 10 sec on; 60 sec off 1 hr/day | 0.40 | 0.73 | 1.06 | 1.40 |
| 1.8 Ω (IEC Photoflash) | 15 sec on; 60 sec off | 0.67 | 1.25 | 1.76 | 1.96 |
| 0.1 Amp | Continuous | ? | ? | ? | ? |

Figure 5:
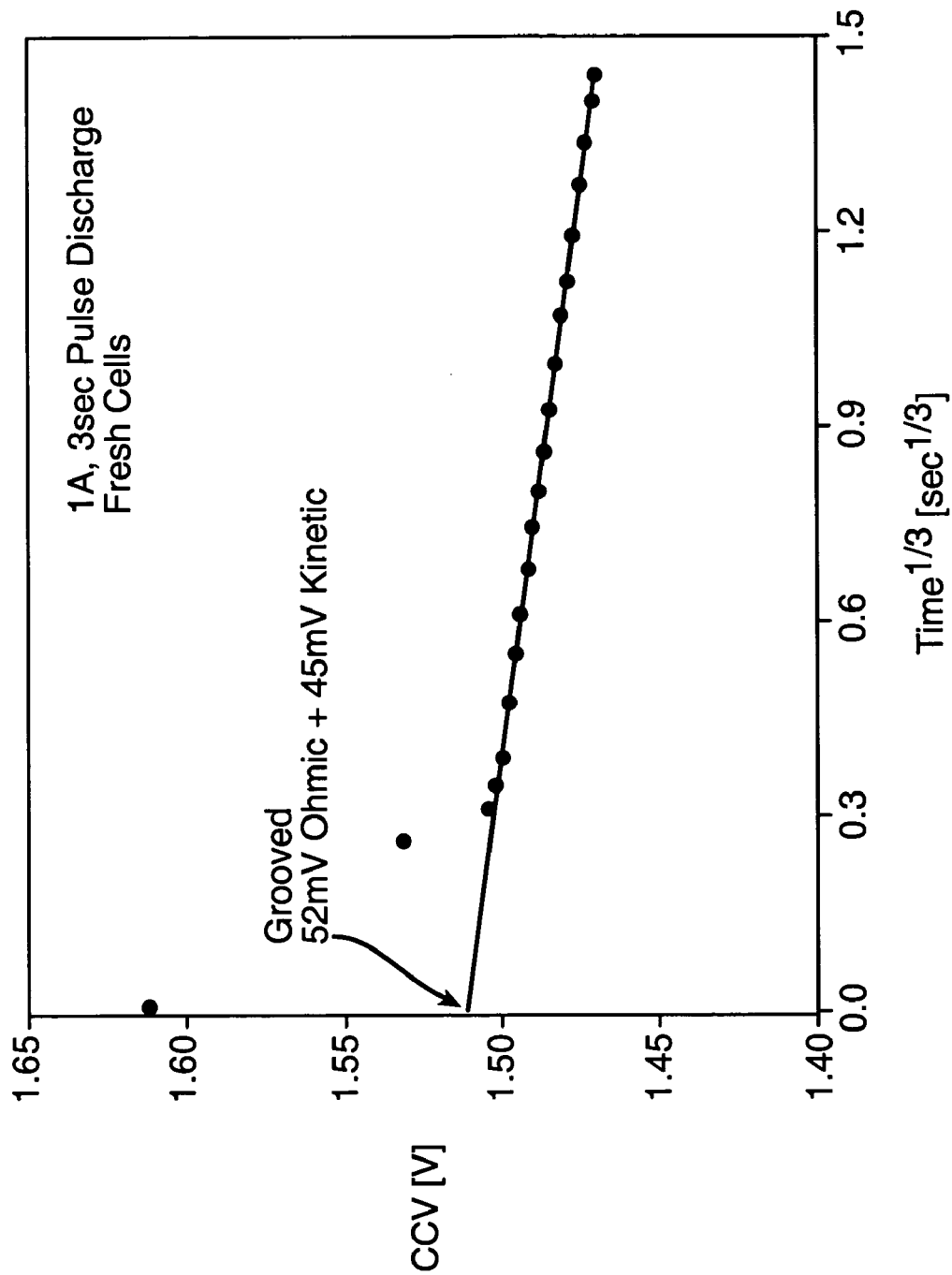
FIG. 5 is a graph showing closed circuit voltage vs. time for a battery having a grooved cathode.

The strong performance of batteries having grooved cathodes may be attributable to the grooves and/or the increased electrolyte added to the battery. Grooving the cathode increases the interior surface area of the cathode, thereby lowering the current density at the cathode reaction interface, e.g., the cathode/separator interface. Referring to FIG. 5, at an initial period under 1 A, a grooved-cathode battery exhibits an Ohmic resistance of 52 mV and a kinetic resistance of 45 mV, possibly due to the high surface area at the interior cathode surface.

Increasing the surface area of the cathode may also lower cathode polarization and curvature effects typically present with cylindrical cathodes. Cathode polarization results from limited diffusion across the cathode/separator interface. When the surface layer of the $MnO_2$ particles is discharged, lower oxides may form which cause increased polarization resistance. Grooving or roughening the cathode generates higher surface area at the reaction interface of the cathode that may generate a more uniform current distribution such that, for example, the entire cathode thickness can be discharged at a similar rate, and/or may generate a low current density and consequently less voltage drop across the interface. Similarly, grooving a cylindrical cathode may also allow faster transport of the cell's reactants and products, e.g., by reducing the cylindrical geometry of the cathode.

Figure 6:
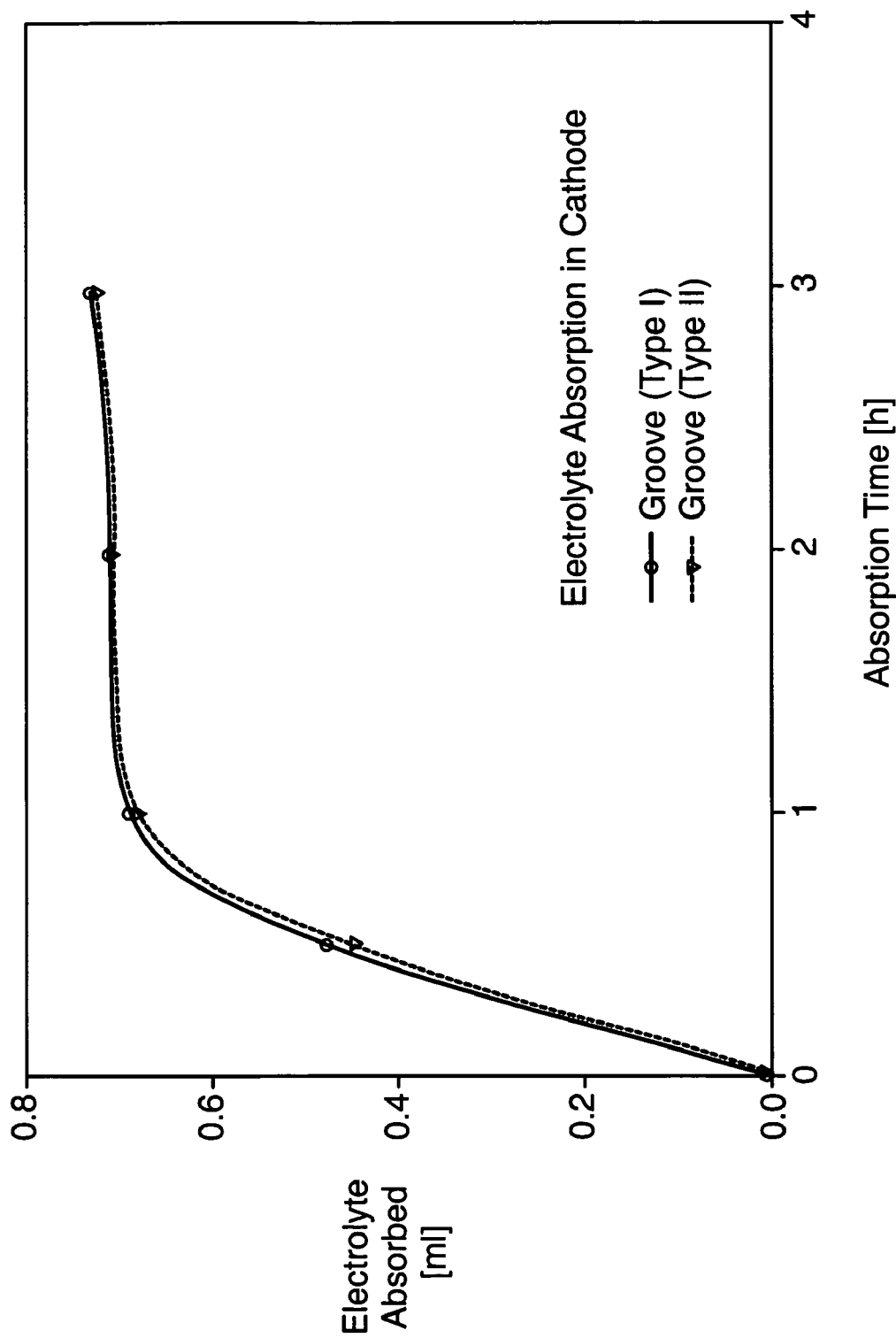
FIG. 6 is a graph showing electrolyte absorbed vs. time for batteries having grooved cathodes.

Forming the grooves can also improve sorption of electrolyte by opening pores at the cathode surface and/or by modifying the density of the cathode pellets by applying mechanical stresses. Referring to FIG. 6, the effect of the grooves on electrolyte sorption is demonstrated. Measurements were performed by filling the cathode up to the top with electrolyte and pouring out the electrolyte after different periods of time. The weight gain by the cathode was measured gravimetrically. As shown in FIG. 6, the rate of sorption was high in the grooved cathodes. This data indicate that grooved cathodes may induce low mass transfer resistance, not only in the cathode but in the separator and anode. Mechanically forming the grooves can also remove highly compact surface layers formed by the pelletization and re-compaction process used to form the cathodes.

Generally, increasing the surface area of the cathode, combined with increasing the amount of electrolyte in the battery, improves the mass transport properties of the battery, i.e., mass transfer resistance is lowered and mass flux is increased. Having limited electrolyte generally increases the electrode polarization and separator polarization at low voltage cutoffs because of high mass transfer resistance and earlier anode passivation. Adding more electrolyte can improve the critical capacity yield of a battery, defined as the capacity yield at which the internal resistance of the cell is drastically increased due to electrolyte depletion during discharge or during a rest period. Adding more electrolyte can lower separator polarization, e.g., the voltage drop across the separator due to ohmic and mass transfer resistance. Adding more electrolyte can also delay passivation of the anode, which occurs when hydroxide ions in the electrolyte are depleted. As shown in FIGS. 7A-B, adding more electrolyte to a grooved-cathode battery can delay anode passivation under galvanostatic and galvanodynamic conditions.

Figure 8A:
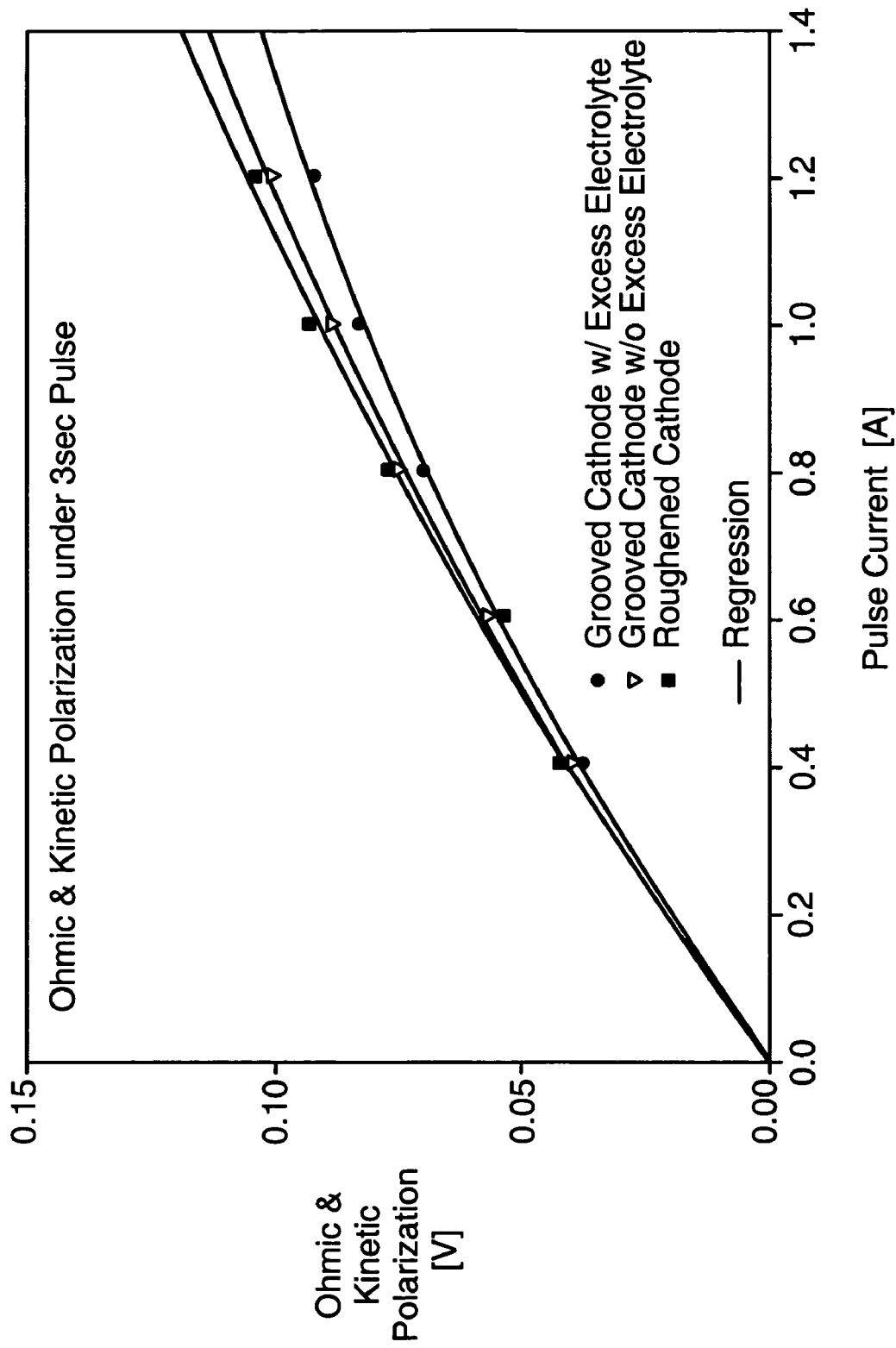

Referring to FIGS. 8A-B, the advantage of grooved or roughened cathodes is further demonstrated. FIG. 8A shows that batteries having a roughened cathode or a grooved cathode, with or without excess electrolyte, induce low Ohmic and kinetic polarization. Similarly, FIG. 8B demonstrates that mass transfer polarization is low for roughened or grooved cathodes. Thus, referring to FIG. 9, the overall cell polarization of a roughened or grooved-cathode battery is low, thereby providing the battery with high capacity.

Figure 10:
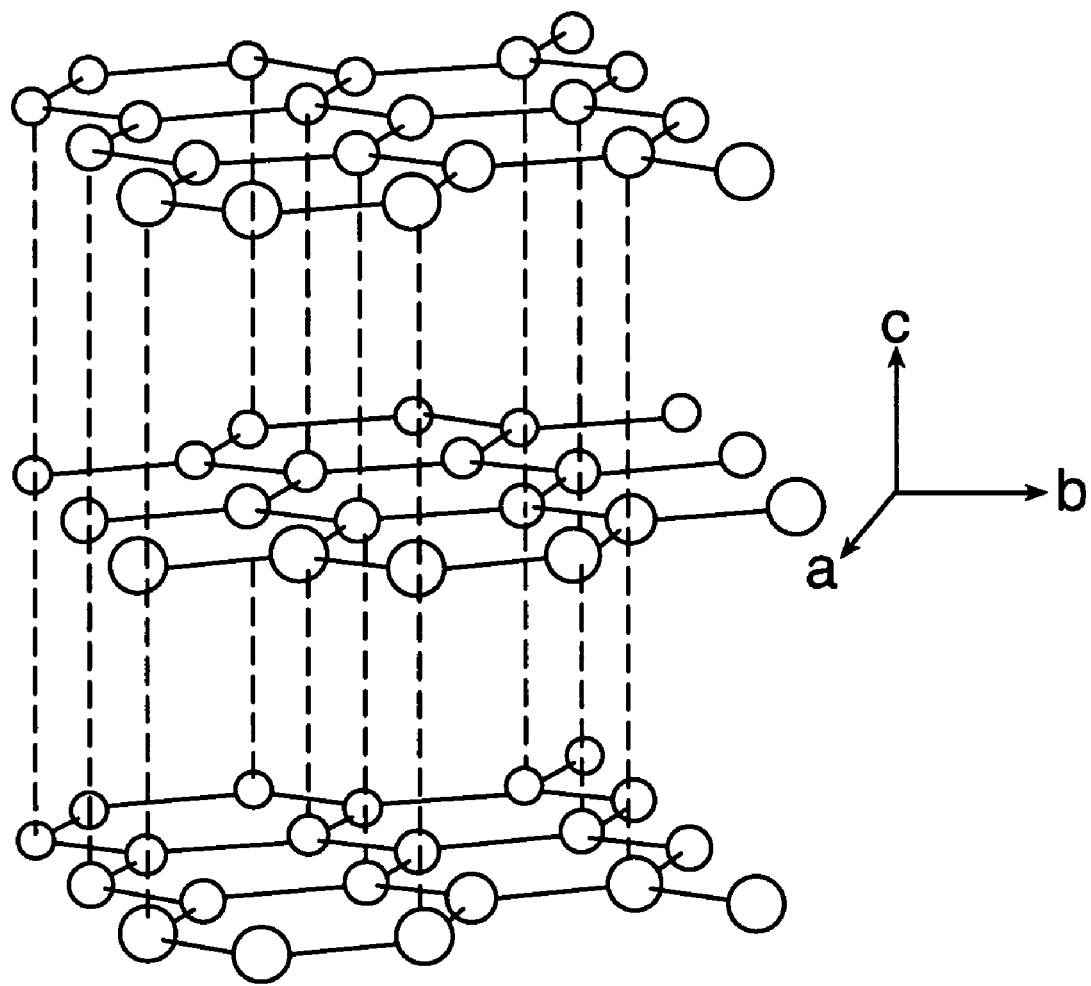
FIG. 10 is a diagram illustrating an atomic structure of graphite particles.

Another possible explanation for improved battery performance is that roughening or grooving the cathode produces a surface on the cathode that provides the cathode with better electronic and ionic conduction. Referring to FIG. 10, the graphite particles 30 have a layered atomic structure in which carbon atoms are bonded in hexagonal arrays arranged in crystallographic a-b planes. Bonding along the c-direction is mainly weak bonding, such as from van der Waals or weak covalent bonds. Consequently, electronic conduction in the graphite particles occurs mainly in the a-b planes. Also, due to its atomic structure, the graphite particles generally exhibit preferred orientation, e.g., graphite particles can be used as lubricants since they generally orient with their a-b planes parallel to a shearing or sliding force.

Figure 11:
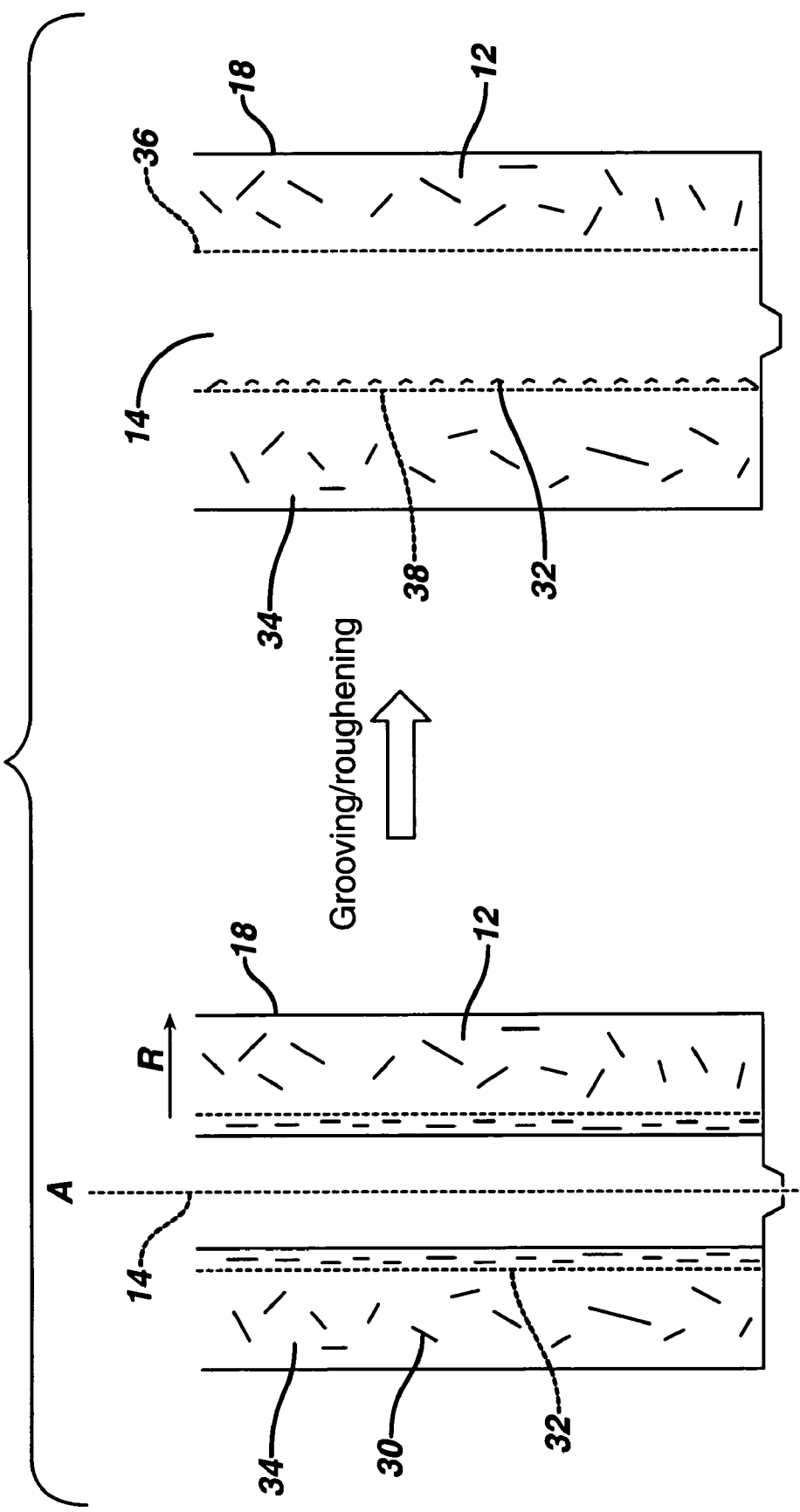
FIG. 11 is a diagram illustrating a possible effect of grooving or roughening on the surface of a cathode.

Referring to FIG. 11, some methods of forming a cored cylindrical cathode produce a cathode 12 wherein the graphite particles 30 can be predominantly oriented at random within the bulk of the cathode, herein called the "unaffected zone" 32. However, these methods can also produce a shiny, glazed, relatively impermeable layer on the inner and outer surfaces of the cathode. Within this layer, herein called an "affected zone" 34, the graphite particles 30 may be preferentially oriented with their a-b planes parallel to the longitudinal axis (A) of the battery and their crystallographic c-axes perpendicular to axis (A). Since electronic and ionic conduction in cathodes of cylindrical cells are generally in the radial direction (R), the orientation of the graphite particles in the affected zone 34 may hinder the cell's electronic conductivity, ionic mobility, and electrolyte permeability.

Referring to FIG. 11, grooving or roughening the surfaces of the cathode may improve the performance of the battery by removing the affected zone completely 36 or by removing enough of the affected zone 32 from the surface layer to approximate the unaffected zone 38. With enough affected zone removed, electronic and ionic conduction, as well as liquid permeability, can approach levels reaching those of a cathode having no affected zone.

Thus, because conduction in the cathode occurs generally in the radial direction (R), and because electronic conduction in the graphite particles occurs mainly in the a-b plane, it is generally preferred that the cathode contain graphite particles having their a-b planes oriented parallel to the radial direction (R). For cylindrical cells, the graphite particles preferably have their a-b planes perpendicular to the longitudinal axis A. Preferably, this orientation is maintained throughout the cathode and in particular at the cathode's surface, i.e., at the cathode/separator and cathode/can interfaces, where undesirable preferred orientation and glazing can occur.

A method of making a cathode for a cylindrical cell having a desired graphite particle orientation and which minimizes formation of a glazed surface will now be described. A fraction, e.g., about 25%, of the total cathode powder or granulate is placed in a battery can. The can is placed and supported in a tight fitting die. The cathode powder is compacted by pressing a compaction plunger into the can to form a solid slug in the bottom of the can. After compaction, the upper surface of the slug is essentially perpendicular to the longitudinal axis of the can. The compaction force helps to orient the a-b plane of the graphite particles parallel the radial direction.

The plunger is withdrawn from the can, and an additional fraction of cathode powder is placed in the can. Compaction with the plunger is repeated. The above filling and compaction steps are repeated, e.g., four times, until a desired solid cathode cylinder is formed.

The fractions of cathode powder that are added after the first or second fraction can also be compacted multiple times to provide a cathode cylinder with uniform hardness. In an exemplary pack and drill method, a first fraction of cathode powder is placed in the can and compacted or pressed. A second fraction is placed in the can on top of the first fraction and compacted. A third fraction is placed on top of the second fraction and compacted twice, allowing the third fraction to relax in between compactions. Then, a fourth fraction is placed on top of the third fraction and compacted three times, allowing the fourth fraction to relax in between compactions. While the bottom fractions (e.g., first and second) may also experience additional pressures from the multiple compactions of the top fractions (e.g., third and fourth), generally these pressures are not as great as the pressures on the top fractions. Thus, this method generally exposes each fraction of cathode material to about the same compaction pressures so that the formed cathode cylinder can have uniform strength and hardness. It is believed that this method provides the formed battery with enhanced storage characteristics.

After the cathode cylinder is formed, the can is removed from the support die and secured to a drilling machine, e.g., a lathe. The cathode cylinder is drilled in one or more passes to form a cathode cavity for the anode. The bottom of the cathode, including a hollow volume of a pip, may be drilled out, if desired. The method produces a cathode with the desired graphite particle orientation and minimized glazing of the cathode surfaces. This "pack and drill" method can substantially orient the graphite particles such that the a-b planes are parallel to the plane of conduction, e.g., parallel to the radial direction, at the inner diameter, at the outer diameter, and within the bulk of the cathode for cylindrical cells. This orientation facilitates both electronic and ionic conduction.

Table 3 shows data for cells having cathodes made by the above pack and drill method. Generally, batteries made by the above method exhibit good performance, particularly at high drain and to high voltage endpoints.

TABLE 3

|  | End Point Voltage | | |
| --- | --- | --- | --- |
|  | 1.1 V | 1.0 V | 0.8 V |
| "Pack and Drill" cell | 0.563 hrs | 0.919 | 1.412 |

In another variation of the above-described pack and drill method, the cathode material is placed in the can as formed solid pellets rather than as granulate. Cathode powder or granulate is pressed into pellets, e.g., each pellet can be formed about 25% of the finished size of the cathode. A first pellet is placed in the can and compacted, e.g., with a plunger. A second pellet is placed in the can on top of the first pellet and compacted. Additional pellets can be added and compacted until the desired solid cathode cylinder is formed. The cathode may be drilled as described above. The last two pellets are subjected to multiple compactions, as described above.

A number of embodiments of the invention have been described. Nevertheless, it will be understood that various modifications may be made without departing from the spirit and scope of the invention. For example, while the above description discusses alkaline cells, the invention can be applied to other types of batteries, such as metal-air batteries and air recovery batteries. Similarly, the invention can be applied to non-cylindrical batteries, such as button cells, prismatic cells, and racetrack cells. The invention can be applied to multi-lobed electrode batteries, as described in U.S. Ser. No. 09/358,578, filed Sep. 21, 1999, hereby incorporated by reference.

The cavity formed by the pack and drill method can be formed by first forming a smaller cavity, such as by pressing hollow cylinders through the cathode or by extrusion, and then enlarging the smaller cavity by drilling, boring, or abrasion. The cavity may have a non-cylindrical cross section. Orientation of the graphite particles may be aided by mechanical shock applied in the appropriate direction, alternating magnetic fields, electrostatic fields, sonic fields, and slip-casting in porous molds.

Figure 12:
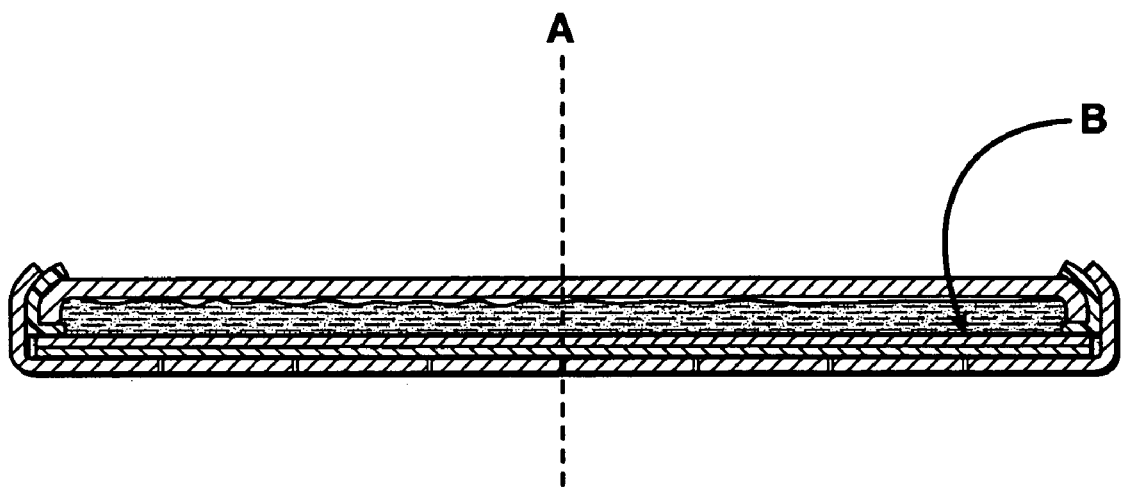
FIG. 12 is a side-sectional view of a prismatic battery.
Figure 13:
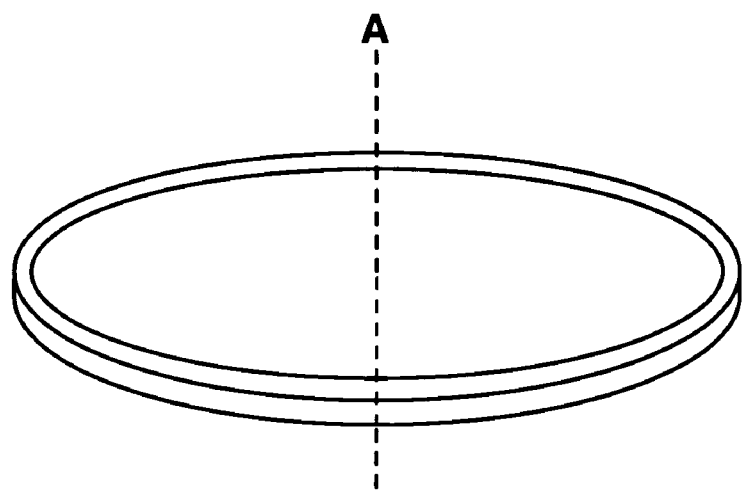
FIG. 13 is a perspective view of a button or coin battery.

The invention can be applied to coin cells, button cells, and prismatic cells. In these batteries, the cathode is generally prismatic, e.g., a circular prism or a rectangular prism. Referring to FIGS. 12 and 13, electronic and ionic conduction in these cells generally flow parallel to the major axis A of the cathodes 12 or perpendicular to the major surface of the cathodes. As used herein, the major surface is the surface perpendicular to the major axis. Thus, the graphite particles are preferably oriented with their a-b planes parallel to the cells' longitudinal axes. The cathodes for these cells may be formed by compacting a block of cathode material and then cutting slices of cathode from the block such that the a-b plane of the graphite particles are parallel to the cells' longitudinal axes when the cathode is placed in the cell.

For cathodes having a current collector, such as a screen or foil, conduction generally occurs mainly perpendicular to the major surface of the current collector. The active material, graphite particles, and binder may be electrostatically deposited on the current collector to provide the desired orientation, i.e., the a-b planes of the graphite particles are perpendicular to the major surface of the current collector, and then the binder is cured to maintain the desired graphite particle orientation.

Other embodiments are within the claims.

What is claimed is:

1. A method of making a battery, comprising
providing a housing with a cathode disposed within the housing, the cathode comprising
an exterior surface aligned substantially parallel to a longitudinal axis and adjacent the housing,
a longitudinally-extending cavity defined at least in part by an interior surface but not by the exterior surface,
manganese dioxide between the interior surface and the exterior surface, and
at least one groove extending about 10 microns to about 450 microns into the interior surface of the cathode; and
inserting a longitudinally-extending separator into the longitudinally-extending cavity adjacent the interior surface of the cathode, wherein a cross-sectional area of the separator, prior to insertion, relative to the longitudinally axis is circular; and
forming an anode in the longitudinally-extending cavity, the separator being between the cathode and the anode.

2. The method of claim 1, wherein the cathode is shaped as a cored cylinder having the interior surface and the exterior surface.

3. The method of claim 1, wherein the groove extends about 70 microns to about 110 microns into the interior surface of the cathode.

4. The method of claim 1, wherein the groove extends about 90 microns to about 110 microns into the interior surface of the cathode.

5. The method of claim 1, wherein the housing has a length, and a cross-sectional area of the separator, after insertion into the housing, relative to the longitudinal axis is essentially uniform and extends for substantially the entire length of the housing.

6. The method of claim 1, wherein the groove extends parallel to the longitudinal axis of the battery.

7. The method of claim 1, wherein the battery is cylindrical.

8. The method of claim 1, further comprising adding an aqueous electrolyte into the housing.

9. The method of claim 6, wherein the electrolyte is an alkaline electrolyte.

10. The method of claim 7, wherein the alkaline electrolyte comprises potassium hydroxide.

11. The method of claim 1, wherein the manganese dioxide comprises electrolytically-synthesized manganese dioxide.

12. The method of claim 1, wherein the cathode comprises between about 80% and about 88% by weight of the manganese dioxide.

\* \* \* \* \*

UNITED STATES PATENT AND TRADEMARK OFFICE
CERTIFICATE OF CORRECTION

PATENT NO. : 7,682,730 B2  
APPLICATION NO. : 11/374674  
DATED : March 23, 2010  
INVENTOR(S) : Terry Copeland et al.

It is certified that error appears in the above-identified patent and that said Letters Patent is hereby corrected as shown below:

In Claim 9, delete "claim 6," and insert --claim 8,--, therefor.

In Claim 10, delete "claim 7," and insert --claim 9,--, therefor.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,682,730 B2
APPLICATION NO. : 11/374674
DATED : March 23, 2010
INVENTOR(S) : Terry Copeland et al.

It is certified that error appears in the above-identified patent and that said Letters Patent is hereby corrected as shown below:

Column 10, line 41, In Claim 9, delete "claim 6," and insert --claim 8,--, therefor.

Column 10, line 43, In Claim 10, delete "claim 7," and insert --claim 9,--, therefor.

This certificate supersedes the Certificate of Correction issued May 18, 2010.

Signed and Sealed this

Fifteenth Day of June, 2010

David J. Kappos
*Director of the United States Patent and Trademark Office*